(12) United States Patent
Takeda

(10) Patent No.: US 7,244,376 B2
(45) Date of Patent: Jul. 17, 2007

(54) HEXABORIDE PARTICLES, HEXABORIDE PARTICLE DISPERSION, AND ARTICLE MAKING USE OF HEXABORIDE PARTICLES OR HEXABORIDE PARTICLE DISPERSION

(75) Inventor: Hiromitsu Takeda, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 534 days.

(21) Appl. No.: 10/763,258

(22) Filed: Jan. 26, 2004

(65) Prior Publication Data

US 2005/0161642 A1 Jul. 28, 2005

(51) Int. Cl.
- C09C 1/68 (2006.01)
- C09C 3/12 (2006.01)
- B32B 5/16 (2006.01)
- H01B 1/00 (2006.01)

(52) U.S. Cl. ............... 252/587; 252/518.1; 252/519.1; 252/511; 252/500; 428/405; 428/324; 428/328; 428/689; 106/287.1; 106/287.16; 427/219; 427/387; 501/97.2; 501/97.3; 423/289; 524/404

(58) Field of Classification Search ............... 252/500, 252/511, 518.1; 428/323, 357, 403–405, 428/411.1, 422, 426, 447, 689, 697; 106/287.11, 106/287.16; 427/219

See application file for complete search history.

(56) References Cited

U.S. PATENT DOCUMENTS 4,076,883 A * 2/1978 Dittrich et al. ............. 428/387
6,060,154 A * 5/2000 Adachi et al. .............. 428/323
6,221,945 B1 * 4/2001 Kuno et al. ................. 524/401
6,277,187 B1 * 8/2001 Kuno et al. ............. 106/287.16
6,319,613 B1 * 11/2001 Takeda et al. .............. 428/412
2003/0138637 A1 * 7/2003 Aruga et al. ................ 428/422
2004/0071957 A1 * 4/2004 Fujita ......................... 428/328

FOREIGN PATENT DOCUMENTS

| JP | 11-181336 | 7/1999 |
| JP | 2000-72484 | 3/2000 |
| JP | 2000-169765 | 6/2000 |
| JP | 2003-277045 | * 10/2003 |

OTHER PUBLICATIONS

"Polymer Coatings Stick on Optical Glass Surface," Penn State University, Science Daily, 2001, p. 1.*

* cited by examiner

Primary Examiner—Mark Kopec
Assistant Examiner—Kallambella Vijayakumar
(74) Attorney, Agent, or Firm—Armstrong, Kratz, Quintos, Hanson & Brooks, LLP.

(57) ABSTRACT

In hexaboride particles having particles of a hexaboride of at least one element (X) selected from Y, La, Ce, Pr, Nd, Sm, Eu, Gd, Tb, Dy, Ho, Er, Tm, Yb, Lu, Sr and Ca, or a dispersion of such particles, the surfaces of the hexaboride particles have physically been coated with a surface treatment agent containing silicon, selected from a silazane type treatment agent, a chlorosilane type treatment agent, an inorganic treatment agent having at least one alkoxyl group in the molecular structure, and an organic treatment agent having at least one alkoxyl group at a molecular terminal or in the side chain, or have been coated with the surface treatment agent, having chemically combined with hexaboride particles on the surfaces of the hexaboride particles.

15 Claims, No Drawings

HEXABORIDE PARTICLES, HEXABORIDE PARTICLE DISPERSION, AND ARTICLE MAKING USE OF HEXABORIDE PARTICLES OR HEXABORIDE PARTICLE DISPERSION

BACKGROUND OF THE INVENTION

1. Field of the Invention

This invention relates to compound particles of boron (B) and at least one element (X) selected from Y, La, Ce, Pr, Nd, Sm, Eu, Gd, Tb, Dy, Ho, Er, Tm, Yb, Lu, Sr and Ca (hereinafter often "hexaboride particles"), and a hexaboride particle dispersion in which the hexaboride particles stand dispersed in a liquid medium or a solid medium (thus, the "dispersion" termed in the present invention refers to a disperse system such as a fluid dispersion or a solid dispersion). More particularly, this invention relates to hexaboride particles improved in water resistance and a dispersion of such hexaboride particles, and also to an article making use of the hexaboride particles or this dispersion.

2. Description of the Related Art

Hexaboride particles typified by $LaB_6$ and so forth have properties such that they have a high light transmittance and a low reflectance in the visible-light region and have a low light transmittance in the near infrared region. Accordingly, in recent years, they are used as solar radiation shielding materials (see Japanese Patent Application Laid-open No. 2000-169765).

Now, the hexaboride particles are known to be surface-decomposed by moisture or water in the air. In particular, where they are present in the state of fine particles, they have increased in their surface area in respect to volume, and hence the surfaces of hexaboride particles are decomposed by the moisture or water to change into compounds of oxides or hydroxides in a large proportion, so that a phenomenon may appear in which the properties inherent in the hexaboride become gradually low.

Then, where coating films or the like making use of hexaboride particles are used for such a purpose of shielding the light in the near infrared region, utilizing their optical properties, the light transmittance in the region of 200 nm to 2,600 nm may rise under the influence of the moisture or water to cause gradual deterioration of solar radiation shielding performance. There has been such a problem, but any methods for preventing it have not been developed.

SUMMARY OF THE INVENTION

The present invention has been made taking note of such a problem. Accordingly, an object of the present invention is to provide hexaboride particles improved in water resistance and preferably usable as a solar radiation shielding material, a dispersion in which such hexaboride particles stand dispersed in a liquid medium or a solid medium, and an article making use of the hexaboride particles or this dispersion.

More specifically, the hexaboride particles according to the present invention are particles of a hexaboride of at least one element (X) selected from Y, La, Ce, Pr, Nd, Sm, Eu, Gd, Tb, Dy, Ho, Er, Tm, Yb, Lu, Sr and Ca, wherein;

the surfaces of the hexaboride particles have physically been coated with a surface treatment agent containing silicon, selected from a silazane type treatment agent, a chlorosilane type treatment agent, an inorganic treatment agent having at least one alkoxyl group in the molecular structure, and an organic treatment agent having at least one alkoxyl group at a molecular terminal or in the side chain, or have been coated with the surface treatment agent, having chemically combined with hexaboride particles on the surfaces of the hexaboride particles.

The dispersion according to the present invention comprises the hexaboride particles having been coated with the above surface treatment agent, which stand dispersed in a liquid medium or a solid medium.

The article according to the present invention, making use of the hexaboride particles, comprises a substrate and layered directly on the surface thereof the hexaboride particles having been coated with the above surface treatment agent, to compose an article having a coating film of the hexaboride particles.

As the article according to the present invention, making use of the hexaboride particle dispersion, the dispersion in which the hexaboride particles stand dispersed in a solid medium composes a coating film formed on the surface of a substrate, or composes a film of 0.1 µm or more to a board of 50 mm or less in thickness.

Thus, according to the hexaboride particles of the present invention, the surfaces of the hexaboride particles have physically been coated with the surface treatment agent containing silicon, selected from a silazane type treatment agent, a chlorosilane type treatment agent, an inorganic treatment agent having at least one alkoxyl group in the molecular structure, and an organic treatment agent having at least one alkoxyl group at a molecular terminal or in the side chain, or have been coated with the surface treatment agent, having chemically combined with hexaboride particles on the surfaces of the hexaboride particles. Hence, the hexaboride particles can be improved in water resistance, making it possible to provide hexaboride particles having superior water resistance, and a dispersion thereof, as well as an article such as a film, a sheet, a plate or a board, making use of the hexaboride particles or the dispersion.

DESCRIPTION OF THE PREFERRED EMBODIMENTS

As stated previously, there has been the problem that the surfaces of hexaboride particles change into oxides or hydroxides because of the moisture or the like in the air to cause a lowering of the properties inherent in the hexaboride.

However, it has been discovered that the hexaboride particles can be improved in water resistance where the surfaces of hexaboride particles are physically coated with the surface treatment agent or they are coated with the surface treatment agent, having chemically combined with hexaboride particles on the hexaboride particle surfaces. Thus, the present invention has been accomplished.

One with which the hexaboride particle surfaces are coated is the surface treatment agent. This surface treatment agent may be, as mentioned above, one with which the hexaboride particle surfaces are coated by its chemical reaction with the particle surfaces or one with which the particle surfaces are physically coated. Since the hexaboride particle surfaces are coated with the surface treatment agent, which serves as a hydrophobic substance capable of preventing permeation of moisture or water, the moisture or water can be prevented from coming into contact with the hexaboride particle surfaces, and this consequently brings an improvement in water resistance of the hexaboride particles, as so considered.

The above surface treatment agent may include surface treatment agents containing silicon, selected from a silazane type treatment agent, a chlorosilane type treatment agent, an inorganic treatment agent having at least one alkoxyl group in the molecular structure, and an organic treatment agent having at least one alkoxyl group at a molecular terminal or in the side chain.

The silazane type treatment agent is so strongly reactive with the hexaboride particles that it can form covalent bonds with the hexaboride particles on their particle surfaces to cover the hexaboride particle surfaces. In addition, silazanes are lipophilic and have small molecular structure, and hence they can densely cover particle surfaces to make outermost shells hydrophobic, and are effective in improving water resistance. The silazane type treatment agent may specifically include hexamethyldisilazane, cyclic silazanes, N,N-bis(trimethylsilyl)urea, N-trimethylsilyl acetamide, dimethyltrimethylsilylamine, diethyltrimethylsilylamine, trimethylsilylimidazole, and N-trimethylsilylphenylurea. Besides, hydrolyzates of any of these or polymers thereof may also be used.

As to the chlorosilane type treatment agent, its chloro-group also forms covalent bonds with the hexaboride particles on their particle surfaces. This makes particle surfaces covered with the chlorosilane type treatment agent to bring an improvement in water resistance. The chlorosilane type treatment agent may typically include methyltrichlorosilane, methyldichlorosilane, dimethyldichlorosilane, trimethylchlorosilane, phenyltrichlorosilane, diphenyldichlorosilane, trifluoropropyltrichlorosilane, heptadecafluorodecyltrichlorosilane, and vinyltrichlorosilane. Besides, hydrolyzates of any of these or polymers thereof may also be used.

As to the inorganic treatment agent having at least one alkoxyl group in the molecular structure, its alkoxyl groups form covalent bonds with the hexaboride particles on their particle surfaces. This makes particle surfaces covered with this treatment agent, and also their outermost shells are composed of the inorganic treatment agent or lipophilic groups or hydrophobic groups of the inorganic treatment agent, to bring an improvement in water resistance. This inorganic treatment agent may typically include silane type coupling agents, which may specifically include vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropyltriethoxysilane, γ-glycidoxypropylmethyldiethoxysilane, γ-methacryloxypropylmethyldimethoxysilane, γ-methacryloxypropyltriethoxysilane, N-β-(aminethyl)-γ-aminopropylmethyldimethoxysilane, N-β-(aminethyl)-γ-aminopropyltrimethoxysilane, γ-aminopropyltrimethoxysilane, γ-aminopropyltriethoxysilane, N-phenyl-γ-aminopropyltrimethoxysilane, γ-chloropropyltrimethoxysilane, and γ-mercaptopropyltrimethoxysilane. This inorganic treatment agent may further include the following compounds, which are classified as alkoxysilane surface treatment agents, i.e., tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltriethoxysilane, decyltriethoxysilane, decyltrimethoxysilane, trifluoropropyltrimethoxysilane, and heptadecatrifluorodecyltrimethoxysilane. Besides, hydrolyzates of any of these or polymers thereof may also be used.

An organic treatment agent is also effective which has at least one alkoxyl group at a molecular terminal or in the side chain and whose backbone chain is a lipophilic high polymer such as epoxy, acryl or urethane. Its alkoxyl groups form covalent bonds with the hexaboride particles on their particle surfaces, and the outermost shells of the particles come to stand composed of the lipophilic high polymer such as epoxy, acryl or urethane, to bring an improvement in water resistance.

As methods by which the hexaboride particle surfaces are coated with the surface treatment agent containing silicon, selected from the silazane type treatment agent, the chlorosilane type treatment agent, the inorganic treatment agent having at least one alkoxyl group in the molecular structure and the organic treatment agent having at least one alkoxyl group at a molecular terminal or in the side chain, there are no particular limitations on the methods as long as the hexaboride particle surfaces can be coated with the surface treatment agent. For example, a solution of the surface treatment agent may directly be sprayed on the hexaboride particles, followed by drying and at the same time heat treatment to make them physically or chemically coated with the surface treatment agent.

As a process by which the hexaboride particle surfaces are coated with the surface treatment agent in a good efficiency, a wet-process is available. This process is a process in which the hexaboride particles are dispersed in an appropriate solvent and the surface treatment agent is added thereto to coat the hexaboride particle surfaces. The surface treatment agent described above covers the hexaboride particle surfaces in the solvent in a good efficiency, thus the hexaboride particles improved in water resistance can be obtained. Incidentally, in this wet-process, a method may be employed in which a solvent is removed by evaporation from a fluid dispersion in which the hexaboride particles and the surface treatment agent stand dispersed and this is heated and dried, followed by pulverization to obtain hexaboride particles the surfaces of which have been coated with the surface treatment agent. As a result of this treatment of heating and drying, the coatings of the surface treatment agent which are formed on the hexaboride particle surfaces come denser to bring a more improvement in water resistance, than those in a method in which the hexaboride particles are merely coated in a solvent. The heating and drying temperature therefor depends on the temperature to which the hexaboride is resistant and the atmosphere of heating. Heat treatment at 600° C. or less is preferred because the hexaboride oxidizes at about 600° C. in an atmosphere in which oxygen is present, i.e., in the air. Also, in an inert-gas atmosphere in which no oxygen is present, the upper limit of heating temperature is the temperature at which the hexaboride decomposes. However, at 1,000° C. or more, changes in density of the coatings composed of the surface treatment agent with which the hexaboride particle surfaces are coated may less take place in practice (i.e., the action of densification due to heat treatment is less effective), and hence the effect on moisture resistance or water resistance tends to saturate. Accordingly, from an industrial viewpoint, the upper limit of heating temperature may preferably be about 1,000° C.

The hexaboride particles coated with the surface treatment agent are used as, e.g., a solar radiation shielding material in the state of particles alone or in the state they have been dispersed in a liquid medium or a solid medium.

Here, the average particle diameter of the hexaboride particles may be set to an appropriate average particle diameter within the range of from 10 nm to 10 μm according to purposes of application for which the particles are used. For example, where the hexaboride particles are applied to an optical selective transmission film (the film mentioned previously that transmits the light in the visible-light region and shields the light in the near infrared region), the light scattering caused by particles must be taken into account. In attaching importance to transparency, the hexaboride particles may have an average particle diameter of 200 nm or less, and preferably 100 nm or less. The reason therefor is that, if such fine particles are larger than 200 nm in average particle diameter, they may scatter the light in the visible-light region of from 380 nm to 780 nm by geometric scattering or Mie scattering to make the film look like frosted glass, making it unable to achieve clear transparency. As long as they are 200 nm or less in average particle diameter, the above scatter may less occur to come to the Rayleigh scattering region. In the Rayleigh scattering region, the light scattering less occurs in inverse proportion to the 6th power of the particle diameter, and hence the scattering less occurs with a decrease in the particle diameter to bring an improvement in transparency. Further, those of 100 nm or less in average particle diameter make the light scattering very less occur, and are preferred. However, in some fields, such transparency is not required depending on purposes of application for which the particles are used. Thus, the average particle diameter may appropriately be set within the range of from 10 nm to 10 µm.

Where the fine particles having an average particle diameter of, e.g., 200 nm or less are surface-treated, a method is preferable in which agglomerates of the fine particles are broken up in a liquid and uniformly dispersed in the liquid, to which the surface treatment agent is added to allow it to act on the particle surfaces, or the surface treatment agent is simultaneously added when the agglomerates are broken up in a liquid, to make the particle surfaces coated with it. Then, as a means for breaking up the agglomerates of the fine particles, it may include, but is by no means limited to, ultrasonic irradiation and a medium agitation mill. Further, where the hexaboride particles are held in a liquid in the state the former has uniformly been dispersed in the latter, a slurry to which the surface treatment agent has been added may be subjected to dispersion treatment by means of the ultrasonic irradiation or the medium agitation mill. Here, the surface treatment agent acts on the particle surfaces, and is also effective in dispersedly holding the fine particles uniformly in the liquid.

Where the hexaboride particles coated with the surface treatment agent are used in the state they have been dispersed in a liquid medium, the medium may be a liquid medium such as an organic solvent (such as alcohol) or water. It may also be a liquid medium such as an organic solvent or water which contains a resin, a metal alkoxide or the like. Incidentally, in order to obtain such a dispersion in which the hexaboride particles coated with the above surface treatment agent stand dispersed in the liquid medium, a method is available in which the hexaboride particles coated with the above surface treatment agent, obtained by the above wet process or the like, are added to the liquid medium such as an organic solvent (such as alcohol) or water or the liquid medium such as an organic solvent or water which contains a resin, a metal alkoxide or the like, to obtain the dispersion. A method may also be employed in which the dispersion is simultaneously obtained when the particles are surface-treated. More specifically, a method may be employed in which hexaboride particles having not been surface-treated and the surface treatment agent are dispersed in the liquid medium such as an organic solvent (such as alcohol) or water to obtain simultaneously with the surface treatment the dispersion in which the hexaboride particles coated with the surface treatment agent stand dispersed.

A case is also available in which the hexaboride particles coated with the surface treatment agent are used as they are, to compose, e.g., a solar radiation shielding product, or a case in which they are dispersed in a solid medium such as resin or glass, and in this state compose the solar radiation shielding product or the like, or are pulverized so as to compose a powdery material for the solar radiation shielding product.

The former case is exemplified by a case in which the hexaboride particles coated with the surface treatment agent are dispersed as they are, in the liquid medium such as an organic solvent (such as alcohol) or water to prepare a dispersion (fluid dispersion), which is then coated on the surface of a suitable substrate and thereafter the liquid medium such as an organic solvent or water is removed by heating to obtain a solar radiation shielding product on the substrate surface of which the hexaboride particles coated with the surface treatment agent have directly been layered. Incidentally, the hexaboride particles can be used in this way in a case in which the surface treatment agent used has thermal adhesion alone to the substrate. Hence, where the surface treatment agent has a weak adhesive force, the hexaboride particles may be layered on the substrate surface and thereafter a coating material containing a binder component such as a resin may be coated thereon and also the solvent component in the coating material may be removed to obtain a solar radiation shielding product coated with the resin.

Meanwhile, as the latter case, the hexaboride particles coated with the surface treatment agent may be dispersed in the liquid medium such as an organic solvent or water which contains a resin, a metal alkoxide or the like, to prepare a dispersion (fluid dispersion), which is then coated on the surface of a suitable substrate and thereafter the solvent such as an organic solvent or water is evaporated, and also the resin and metal alkoxide or the like are cured. Thus, a dispersion (solid dispersion) in which the hexaboride particles coated with the surface treatment agent stand dispersed in a solid medium (cured product) can be produced with ease (i.e., a resin or glass coating in which the hexaboride particles coated with the surface treatment agent stand dispersed). Incidentally, as the resin component, it may be selected according to uses, and may include ultraviolet-curable resins, heat-curable resins, cold-curing resins, and thermoplastic resins. Also, where a dispersion prepared using a liquid medium not containing any resin or the like component is used, the hexaboride particles coated with the surface treatment agent may be layered on the substrate surface and thereafter a liquid medium containing the resin or the like component may be coated, followed by curing to obtain the same dispersion as the above.

Here, the film in which the hexaboride particles coated with the surface treatment agent stand dispersed in the solid medium may be subjected to heat treatment. Such heat treatment brings an improvement in moisture resistance. In particular, where hexaboride particles not beforehand subjected to heat treatment in respect of the surface treatment agent are used, this heat treatment makes dense the coatings of the surface treatment agent on the hexaboride particles to bring a more improvement in moisture resistance. The heating temperature for this heat treatment depends on the temperature to which the hexaboride is resistant and the atmosphere of heating, as described above. Heat treatment at 600° C. or less is preferred because the hexaboride oxidizes at about 600° C. in an atmosphere in which oxygen is present, i.e., in the air. Also, in an inert-gas atmosphere in which no oxygen is present, the upper limit of heating temperature is the temperature at which the hexaboride decomposes. However, at 1,000° C. or more, changes in density of the coatings composed of the surface treatment agent with which the hexaboride particle surfaces are coated may less take place, and hence the effect on moisture resistance or water resistance tends to saturate. Accordingly, from an industrial viewpoint, the upper limit may preferably be 1,000° C.

In respect of the dispersion (fluid dispersion) in which the hexaboride particles coated with the surface treatment agent stand dispersed in the liquid medium such as an organic solvent or water which contains a resin, a metal alkoxide or the like, as described above this may be coated on the surface of a suitable substrate to form a coating film so as to be used as a solar radiation shielding product. Instead, in respect of the dispersion (fluid dispersion) in which the hexaboride particles coated with the surface treatment agent stand dispersed in the liquid medium such as an organic solvent or water which contains a resin, a metal alkoxide or the like, this may be dried and subjected to heat treatment and also pulverization treatment so as to be used as a powdery solar radiation shielding material. More specifically, in respect of a powdery dispersion (solid dispersion) in which the hexaboride particles coated with the surface treatment agent stand dispersed in a solid medium (resin), this may be again dispersed in a liquid medium so as to be used as a fluid dispersion for solar radiation shielding products, or, as described later, may be kneaded with a resin so as to be used as a material for extruded or molded products. Incidentally, also in regard to the average particle diameter of the powdery dispersion obtained by pulverization treatment, the average particle diameter may be set to an appropriate average particle diameter within the range of from 10 nm to 10 μm according to purposes of application for which the particles are used.

Without limitation to the dispersion of the hexaboride particles present in the state of a film on the substrate surface or in the state of the powdery dispersion, the dispersion in which the hexaboride particles coated with the surface treatment agent stand dispersed in a solid medium may also be in a form which composes, e.g., a film of 0.1 μm or more to a board of 50 mm or less in thickness. And, where a material is kneaded with a resin and the kneaded product is formed into a film or a board, the hexaboride particles coated with the surface treatment agent and having particle diameters suited for purposes may directly be kneaded with a resin. Besides, the dispersion in which the above hexaboride particles stand dispersed in the liquid medium may be mixed with a resin, or the powdery dispersion in which the hexaboride particles stand dispersed in the solid medium may be added to a liquid medium and this may be mixed with a resin. In general, when the material is kneaded with a resin, these are heated and mixed at a temperature around the melting point of the resin (about 200° C. to 300° C.). Further, after the material has been mixed with the resin, the mixture may be made into pellets, and the pellets may be formed into a film, a sheet, a plate or a board by various methods. For example, the film, sheet, plate or board may be formed by extrusion, blown film extrusion (inflation extrusion), solution casting and so forth where applicable. Here, the thickness of the film, sheet, plate or board may appropriately be set according to uses. Filler content in respect to the resin (i.e., the amount of the hexaboride particles to be mixed) is variable in accordance with the thickness of the substrate and the required optical properties and mechanical properties. In general, it may preferably be 50% by weight or less based on the resin.

The resin serving as a base material of the film, sheet, plate or board is not particularly limited, and may be selected according to uses. Taking account of weatherability, a fluorine resin is effective. The resin may further include, as resins which are of low cost, high transparency and broad general-purpose properties compared with the fluorine resin, PET (polyethylene terephthalate) resin, acrylic resins, polyamide resins, vinyl chloride resins, polycarbonate resins, olefin resins, epoxy resins, and polyimide resins.

The surface treatment agent may be added to the hexaboride particles in an amount (i.e., proportion) that is arbitrary in principle. If possible, it may preferably be in an amount of from 0.01 part by weight to 100 parts by weight based on 1 part by weight of the hexaboride particles in terms of the silicon contained in the surface treatment agent. This is because, if it is in an amount of less than 0.01 part by weight, the effect brought by the coating of the particle surfaces with it may be so small as to make insufficient the effect of improving water resistance, and, if it is in an amount of more than 100 parts by weight, the improvement in water resistance that is attributable to the surface coating may not be seen, showing a small effect brought by the coating.

An optical filter may be made up using the particles of the hexaboride of at least one element (X) selected from Y, La, Ce, Pr, Nd, Sm, Eu, Gd, Tb, Dy, Ho, Er, Tm, Yb, Lu, Sr and Ca. In such a case (i.e., a case in which the article making use of the dispersion according to the present invention is an optical filter), it can be provided with the properties that it reflects or absorbs the light of about 1,000 nm in wavelength to shield it and transmits the light of 380 nm to 780 nm in wavelength. Such properties come from an electronic structure inherent in the hexaboride. In particular, the hexaboride shows plasmon resonance of free electrons at about 1,000 nm, and hence it broadly absorbs or reflects the light of this region.

In addition, since the product shows a small absorption in the visible-light region of 380 nm to 780 nm, it is suited not only for the use as the optical filter, but also for other uses to transmit visible-light rays and shield near infrared rays. For example, as articles making use of the hexaboride particles or dispersions thereof according to the present invention, they may be applied to window members of houses and automobiles, and to greenhouses and so forth, where they can have advantages that near infrared rays of about 1,000 nm of sunlight are shielded to obtain a high heat insulation effect and at the same time the viewability can be secured.

In the articles such as the optical filter and the window members, the hexaboride particles coated with the surface treatment agent may be used in an amount that may appropriately be changed according to the properties required therefor. And, in the case of a heat-insulating optical filter which transmits visible-light rays and shields near infrared rays, a useful heat insulation effect can be obtained when, e.g., in the case of $LaB_6$, the filler content per 1 $m^2$ is 0.01 g or more. Its upper limit depends on optical properties required. About 50% of sunlight heat energy can be absorbed and shielded when the filler content per 1 $m^2$ is 0.1 g, showing a high heat insulation effect per unit weight.

EXAMPLES

The present invention is described below in greater detail by giving Examples. The present invention is by no means limited to the following Examples.

The term "visible-light transmittance" referred to in Examples is the additive value of the amount of transmitted light that is determined by standardizing the amount of transmission of the light in the region of wavelength of from 380 nm to 780 nm, on the basis of the visual sensitivity of human eyes, and is the value that indicates the brightness the human eyes sense. A larger numerical value is more preferable.

The term "solar-radiation transmittance" also referred to in Examples is the additive value of the amount of transmitted light that is determined by standardizing the amount of transmission of the light in the region of wavelength of from 380 nm to 2,100 nm, on the basis of the amount of transmission of sunlight. A smaller numerical value is more preferable.

The term "transmittance in near infrared region" still also referred to in Examples is the light transmittance at a wavelength of 1,000 nm. As to this numerical value as well, a smaller value is more preferable.

In the following Examples, the above "visible-light transmittance" and "solar-radiation transmittance" are measured by a method according to JIS A 5759 (provided that these are measured on only films, not stuck to glass).

The haze value of each film is further measured according to JIS K 7105. Average dispersed-particle diameter is an average value of dispersed-particle diameters measured with a measuring instrument making use of dynamic light scattering (ELS-800, manufactured by Ohtsuka Denshi K.K.).

Water resistance is evaluated in the following way. Samples are left for 4 days in an environment of 60° C. and 90% RH, where judgement is made by a level of rise in each transmittance. Stated specifically, in samples with visible-light transmittance of 68% to 75%, samples the rise in visible-light transmittance of which is 5 points or less are evaluated as "good", and those of more than 5 points as "poor".

Example 1

20 g of lanthanum hexaboride, 8 g of a silane coupling agent γ-glycidoxypropyltriethoxysilane and 72 g of toluene were mixed with stirring, and the mixture obtained was subjected to dispersion treatment by means of a medium agitation mill to prepare a fluid dispersion in which surface-coated lanthanum hexaboride particles having an average dispersed-particle diameter of 100 nm stood dispersed (a dispersion in which surface-coated hexaboride particles stood dispersed in a liquid medium, solvent).

2 g of this fluid dispersion and 5 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure (a solid dispersion in which the surface-coated hexaboride particles stood dispersed in a solid medium, cured resin).

The film thus formed had a visible-light transmittance of 70%, a solar-radiation transmittance of 49.6%, a transmittance in near infrared region of 24.2% and a haze of 0.9%.

This was left for 4 days in an environment of 60° C. and 90% RH, and thereafter its visible-light transmittance was measured to find that the visible-light transmittance was 71.3%, the rise in transmittance being 1.3 points, and the water resistance of the film was good. Also, the solar-radiation transmittance was 51.6%, the rise in transmittance being 2.0 points, and the transmittance in near infrared region was 26.5%, the rise in transmittance being 2.3 points.

Comparative Example 1

20 g of lanthanum hexaboride and 80 g of toluene were mixed with stirring, and the mixture obtained was subjected to dispersion treatment to prepare a fluid dispersion in which lanthanum hexaboride particles having an average dispersed-particle diameter of 300 nm stood dispersed.

2 g of this fluid dispersion and 5 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 69.2%, a solar-radiation transmittance of 48.2%, a transmittance in near infrared region of 22.6% and a haze of 2.5%.

This was left for 4 days in an environment of 60° C. and 90% RH, and thereafter its visible-light transmittance was measured to find that the visible-light transmittance was 75.6%, the rise in transmittance being 6.4 points, and the water resistance of the film was poor. Also, the solar-radiation transmittance was 59.2%, the rise in transmittance being 11.0 points, and the transmittance in near infrared region was 35.5%, the rise in transmittance being 12.9 points.

Example 2

20 g of cerium hexaboride, 8 g of hexamethyldisilazane and 72 g of toluene were mixed with stirring, and the mixture obtained was subjected to dispersion treatment to prepare a fluid dispersion in which surface-coated cerium hexaboride particles having an average dispersed-particle diameter of 100 nm stood dispersed.

2 g of this fluid dispersion and 5 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 71.7%, a solar-radiation transmittance of 52.6%, a transmittance in near infrared region of 27.5% and a haze of 1.0%.

This was left for 4 days in an environment of 60° C. and 90% RH, and thereafter its visible-light transmittance was measured to find that the visible-light transmittance was 72.9%, the rise in transmittance being 1.2 points, and the water resistance of the film was good. Also, the solar-radiation transmittance was 54.6%, the rise in transmittance being 2.0 points, and the transmittance in near infrared region was 29.8%, the rise in transmittance being 2.3 points.

Example 3

10 g of lanthanum hexaboride, 45 g of methyltrimethoxysilane, 25 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

3 g of this fluid dispersion and 4 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 72.0%, a solar-radiation transmittance of 53.0%, a transmittance in near infrared region of 28.0% and a haze of 0.9%.

This was left for 4 days in an environment of 60° C. and 90% RH, and thereafter its visible-light transmittance was measured to find that the visible-light transmittance was 72.5%, the rise in transmittance being 0.5 point, and the water resistance of the film was good. Also, the solar-radiation transmittance was 53.9%, the rise in transmittance being 0.9 point, and the transmittance in near infrared region was 29.0%, the rise in transmittance being 1.0 point.

Example 4

20 g of lanthanum hexaboride, 8.2 g of methyltrimethoxysilane, 51.8 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

3 g of this fluid dispersion and 4 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 68.0%, a solar-radiation transmittance of 46.6%, a transmittance in near infrared region of 20.5% and a haze of 0.9%.

This was left for 4 days in an environment of 60° C. and 90% RH, and thereafter its visible-light transmittance was measured to find that the visible-light transmittance was 68.5%, the rise in transmittance being 0.5 point, and the water resistance of the film was good. Also, the solar-radiation transmittance was 47.4%, the rise in transmittance being 0.8 point, and the transmittance in near infrared region was 21.5%, the rise in transmittance being 1.0 point.

Example 5

20 g of lanthanum hexaboride, 8.2 g of methyltrimethoxysilane, 51.8 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

This fluid dispersion was subjected to vacuum drying to make the solvent evaporate, followed by heat treatment at 400° C. for 2 hours to obtain a coarse powder. This coarse powder was pulverized by a dry process to obtain a powder of 1 μm to 2 μm in average particle diameter.

20 g of this powder, 8 g of an organic dispersant and 72 g of toluene were mixed, followed by dispersion treatment to prepare a fluid dispersion in which powder particles having an average dispersed-particle diameter of 100 nm stood dispersed.

3 g of this fluid dispersion and 4 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 72.1%, a solar-radiation transmittance of 53.0%, a transmittance in near infrared region of 28.1% and a haze of 0.9%.

This was left for 4 days in an environment of 60° C. and 90% RH, and thereafter its visible-light transmittance was measured to find that the visible-light transmittance was 72.2%, the rise in transmittance being 0.1 point, and the water resistance of the film was good. Also, the solar-radiation transmittance was 53.1%, the rise in transmittance being 0.1 point, and the transmittance in near infrared region was 28.3%, the rise in transmittance being 0.2 point.

Example 6

20 g of lanthanum hexaboride, 8.2 g of methyltrimethoxysilane, 51.8 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

This fluid dispersion was subjected to vacuum drying to make the solvent evaporate, followed by heat treatment at 200° C. for 2 hours to obtain a coarse powder. This coarse powder was pulverized by a dry process to obtain a powder of 1 μm to 2 μm in average particle diameter.

20 g of this powder, 8 g of an organic dispersant and 72 g of toluene were mixed, followed by dispersion treatment to prepare a fluid dispersion in which powder particles having an average dispersed-particle diameter of 100 nm stood dispersed.

3 g of this fluid dispersion and 4 g of an ultraviolet-curable resin UV3701 (available from Toagosei Co., Ltd.) to prepare a coating liquid. Using a 50 μm thick PET film as a substrate, this coating liquid was coated on the PET film by means of a bar coater to form a wet film. The wet film thus formed was dried at 70° C. for 1 minute to make the solvent evaporate to form a film, followed by irradiation with ultraviolet rays by the use of a high-pressure mercury lamp to cause the film to cure.

The film thus formed had a visible-light transmittance of 71.1%, a solar-radiation transmittance of 51.4%, a transmittance in near infrared region of 26.3% and a haze of 0.9%.

This was left for 4 days in an environment of 60° C. and 90% RH, and thereafter its visible-light transmittance was measured to find that the visible-light transmittance was 71.4%, the rise in transmittance being 0.3 point, and the water resistance of the film was good. Also, the solar-radiation transmittance was 52.0%, the rise in transmittance being 0.6 point, and the transmittance in near infrared region was 26.9%, the rise in transmittance being 0.6 point.

Example 7

20 g of lanthanum hexaboride, 8.2 g of methyltrimethoxysilane, 51.8 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

This fluid dispersion was subjected to vacuum drying to make the solvent evaporate, followed by heat treatment at 400° C. for 2 hours to obtain a coarse powder. This coarse powder was pulverized by a dry process to obtain a powder of 1 μm to 2 μm in average particle diameter. The powder obtained was further pulverized by a wet process to have an average particle diameter of about 300 nm, followed by evaporation of the solvent to obtain a powder.

0.01 kg of this powder and 8.7 kg of ETFE (tetrafluoro-ethylene-ethylene copolymer) resin were mixed by a dry process by means of a V-blender, followed by sufficient internal mixing at 320° C. which was around the melt temperature of the resin. The resultant mixture was extruded at 320° C. and formed into a film of about 50 μm in thickness.

The film thus formed had a visible-light transmittance of 71.8%, a solar-radiation transmittance of 52.8%, a transmittance in near infrared region of 27.6% and a haze of 9.8%.

This was left for 4 days in an environment of 60° C. and 90% RH, and thereafter its visible-light transmittance was measured to find that the visible-light transmittance was 71.8%, the rise in transmittance being 0 point, and the water resistance of the film was very good. Also, the solar-radiation transmittance was 52.8%, the rise in transmittance being 0 point, and the transmittance in near infrared region was 27.6%, the rise in transmittance being 0 point.

Example 8

20 g of lanthanum hexaboride, 8.2 g of methyltrimethoxysilane, 51.8 g of ethanol and 20 g of water were mixed with stirring, and the mixture obtained was subjected to dispersion treatment to prepare a fluid dispersion in which surface-coated lanthanum hexaboride particles having an average dispersed-particle diameter of 100 nm stood dispersed.

This fluid dispersion was subjected to vacuum drying to make the solvent evaporate, followed by heat treatment at 400° C. for 2 hours to obtain a coarse powder. This coarse powder was pulverized by a dry process to obtain a powder of 1 μm to 2 μm in average particle diameter. The powder obtained was further pulverized by a wet process to have an average particle diameter of about 150 nm, followed by evaporation of the solvent to obtain a powder.

0.01 kg of this powder and 8.7 kg of PET resin were mixed by a dry process by means of a V-blender, followed by sufficient internal mixing at 300° C. which was around the melt temperature of the resin. The resultant mixture was extruded at 300° C. and formed into a film of about 50 μm in thickness.

The film thus formed had a visible-light transmittance of 70.0%, a solar-radiation transmittance of 49.6%, a transmittance in near infrared region of 24.2% and a haze of 1.2%.

This was left for 4 days in an environment of 60° C. and 90% RH, and thereafter its visible-light transmittance was measured to find that the visible-light transmittance was 70.0%, the rise in transmittance being 0 point, and the water resistance of the film was very good. Also, the solar-radiation transmittance was 49.6%, the rise in transmittance being 0 point, and the transmittance in near infrared region was 24.2%, the rise in transmittance being 0 point.

Comparative Example 2

20 g of lanthanum hexaboride and 80 g of toluene were mixed, and the mixture obtained was subjected to dispersion treatment to prepare a fluid dispersion in which lanthanum hexaboride particles having an average dispersed-particle diameter of 320 nm stood dispersed.

This fluid dispersion was subjected to vacuum drying to remove the solvent to obtain a powder.

0.01 kg of this powder and 8.7 kg of ETFE (tetrafluoro-ethylene-ethylene copolymer) resin were mixed by a dry process by means of a V-blender, followed by sufficient internal mixing at 320° C. which was around the melt temperature of the resin. The resultant mixture was extruded at 320° C. and formed into a film of about 50 μm in thickness.

The film thus formed had a visible-light transmittance of 69.9%, a solar-radiation transmittance of 49.5%, a transmittance in near infrared region of 24.1% and a haze of 14.8%.

This was left for 4 days in an environment of 60° C. and 90% RH, and thereafter its visible-light transmittance was measured to find that the visible-light transmittance was 75.1%, the rise in transmittance being 5.2 points, and the water resistance of the film was poor. Also, the solar-radiation transmittance was 58.3%, the rise in transmittance being 8.8 points, and the transmittance in near infrared region was 34.6%, the rise in transmittance being 10.5 points.

What is claimed is:

1. Hexaboride particles comprising
   particles of a hexaboride of at least one element (X) selected from Y, La, Ce, Pr, Nd, Sm, Eu, Gd, Tb, Dy, Ho, Er, Tm, Yb, Lu, Sr and Ca; wherein
   the surfaces of said hexaboride particles have physically been coated with a surface treatment agent containing silicon, the surface treatment agent being selected from a treatment agent of silazanes, a treatment agent of chlorosilanes, an inorganic treatment agent having at least one alkoxyl group in the molecular structure, and an organic treatment agent having at least one alkoxyl group at a molecular terminal or in the side chain, or have been coated with the surface treatment agent, the surface treatment agent having chemically combined with hexaboride particles on the surfaces of the hexaboride particles;
   said hexaboride particles are obtained by mixing, with stirring, hexaboride particles having not been coated with the surface treatment agent, the surface treatment agent and a solvent, subjecting the resultant mixture to dispersion treatment to obtain a fluid dispersion, and removing the solvent from the fluid dispersion by evaporation, followed by heating and drying at a temperature of 600° C. or less in the air or at a temperature of 1,000° C. or less in an inert-gas atmosphere and thereafter pulverization.

2. The hexaboride particles according to claim 1, wherein said hexaboride is lantham hexaboride.

3. The hexaboride particles according to claim 1, wherein said hexaboride particles have particle diameters of from 10 nm to 10 μm.

4. The hexaboride particles according to claim 1, wherein said surface treatment agent is in a proportion of from 0.01 part by weight to 100 parts by weight based on 1 part by weight of the hexaboride particles in terms of the silicon contained in the surface treatment agent.

5. An article making use of hexaboride particles which comprises a substrate and layered directly on the surface thereof the hexaboride particles according to any one of claims 1, 2, 3, and 4, to compose an article having a coating film of the hexaboride particles.

6. A dispersion of hexaboride particles which comprises the hexaboride particles according to any one of claims 1, 2, 3, and 4 which stand dispersed in a liquid medium or a solid medium.

7. The dispersion of hexaboride particles according to claim 6, wherein said liquid medium comprises at least one of an organic solvent and water, or comprises at least one of an organic solvent and water in which at least one of a resin and a metal alkoxide has been dissolved or dispersed.

8. The dispersion of hexaboride particles according to claim 6, wherein said solid medium comprises resin or glass.

9. The dispersion of hexaboride particles according to claim 6, wherein the dispersion in which said hexaboride particles stand dispersed in a solid medium composes a coating film formed on the surface of a substrate.

10. The dispersion of hexaboride particles according to claim 6, wherein the dispersion in which said hexaboride particles stand dispersed in a solid medium composes a film of 0.1 or more to a board of 50 mm or less in thickness.

11. The dispersion of hexaboride particles according to claim 6, wherein the dispersion in which said hexaboride particles stand dispersed in a solid medium has been subjected to pulverization treatment to compose a powder.

12. The dispersion of hexaboride particles according to claim 11, wherein the powder obtained by pulverization treatment has particle diameters of from 10 nm to 10 μm.

13. An article making use of the dispersion according to claim 9.

14. An article making use of the dispersion according to claim 10.

15. The hexaboride particles according to claim 1, wherein said hexaboride particles are obtained by mixing, with stirring, hexaboride particles having not been coated with the surface treatment agent, the surface treatment agent and a solvent, subjecting the resultant mixture to dispersion treatment to obtain a fluid dispersion, and removing the solvent from the fluid dispersion by evaporation, followed by heating and drying at a temperature of from 400° C. or more to 600° C. or less in the air and thereafter pulverization.

\* \* \* \* \*